United States Patent [19]

George

[11] 3,862,436

[45] Jan. 21, 1975

[54] TRIANGLE WAVE GENERATOR HAVING DIRECT TUNNEL DIODE SWITCH CONTROL

[75] Inventor: Richard E. George, Anaheim, Calif.

[73] Assignee: Interstate Electronics Corporation, Anaheim, Calif.

[22] Filed: Dec. 19, 1973

[21] Appl. No.: 426,068

[52] U.S. Cl. .......... 307/228, 307/322, 328/181, 328/183

[51] Int. Cl. .......... H03k 4/08

[58] Field of Search .......... 307/228, 322; 328/181, 328/183, 185

[56] References Cited

UNITED STATES PATENTS

| | | | |
|---|---|---|---|
| 3,302,132 | 1/1967 | Karklys | 307/322 |
| 3,440,448 | 4/1969 | Dudley | 328/185 |
| 3,593,198 | 7/1971 | Karcher et al. | 328/183 |
| 3,617,769 | 11/1971 | Hanson | 328/181 |
| 3,621,281 | 11/1971 | Hagen | 328/183 |
| 3,636,371 | 1/1972 | Quillier | 307/228 |
| 3,676,698 | 7/1972 | Hunter | 307/228 |

*Primary Examiner*—Stanley D. Miller, Jr.
*Attorney, Agent, or Firm*—Knobbe, Martens, Olson, Hubbard & Bear

[57] ABSTRACT

A tunnel diode is used to directly drive a current switch for controlling the current supplied to the integrator of a triangle wave generator, a latching circuit being connected to maintain the current switch on the on or off state between successive driving signals from the tunnel diode.

15 Claims, 6 Drawing Figures

PATENTED JAN 21 1975

3,862,436

SHEET 2 OF 3

TRIANGLE WAVE GENERATOR HAVING DIRECT TUNNEL DIODE SWITCH CONTROL

BACKGROUND OF THE INVENTION

This invention relates to triangle wave generators, and more specifically to a circuit for controlling such circuits using a tunnel diode directly coupled to the primary current switch to increase the frequency at which the triangle wave generator will satisfactorily operate.

It has been common in the prior art to generate triangle waveforms by alternately connecting positive and negative sources of current to an integrating device such as a capacitor. As the positive current source charges the capacitor, the voltage across the capacitor, assuming a regulated current source, will increase as a ramp function. It has likewise been common to monitor the voltage across the integrating device and to connect a negative current source when the capacitor voltage reaches a desired peak level. The capacitor voltage will then decrease as a ramp function from this peak voltage and is then commonly monitored to reapply the positive current source when the voltage across the capacitor reaches a desired negative peak level.

Existing triangle wave generators have used the desirable characteristics of tunnel diodes to monitor the voltage level across the capacitor for switching the current sources. Typically, a voltage-to-current converter has been connected across the integrating device and the current from this converter has been applied to a forward biased tunnel diode. Below a predetermined current level the tunnel diode exhibits a relatively low impedance. When, however, the voltage across the integrating device reaches a predetermined level, the current through the tunnel diode reaches a threshold level which causes the tunnel diode to immediately exhibit a relatively high impedance. This impedance shift within the tunnel diode has been used in prior art devices to control a bistable device which is then in turn used to drive the current switch for controlling the current to the integrating device. This intermediate bistable device has been thought in the past to be a necessary element of such triangle wave generators since the tunnel diode exhibits a disadvantageous characteristic as the current is reduced following the voltage wave peak. Thus, if the tunnel diode were used to directly drive the main current switch, when the tunnel diode reached its second threshold level, that is, the current level at which it switches from a relatively high impedance back to a relatively low impedance, the effect would be to again switch the current sources. This second threshold level, that is, the threshold level of the tunnel diode as the current through the diode decreases, is far less accurate than the threshold of the diode as the current therethrough increases. Thus, in the prior art circuits, it has been common to use a pair of tunnel diodes, one for sensing the positive peak level of the triangle wave and the other for sensing the negative peak level of the wave, and to use these tunnel diodes to drive a bistable element such as a flip-flop for controlling the current switch in each direction, In this way the second threshold current of each of the tunnel is ignored by the bistable element and only the precisely determinable threshold of each of the tunnel diodes is used to control the current switch.

This use of an intermediate bistable element necessarily introduces time delay between the tunnel diode threshold and the activation of the current switch. At relatively low frequencies, this time delay is inconsequential and does not interfere with satisfactory operation of the triangle wave generator. However, as the frequency is increased, and particularly, for example, above a frequency of approximately 20 MHz, the time delay of the bistable device distorts the triangle wave. Thus, particularly in a variable frequency generator, it can be seen that the amplitude of the trinagle wave will exceed the desired amplitude as the frequency of the generator is increased since the current source will not be switched until after the desired peak voltage is reached. Furthermore, at even higher frequencies when the time delay within the bistable device approximates one half the period of the triangle wave, it becomes impossible to use this system at all. For this reason it has been typical in the art to expect an upper frequency limit from triangle wave generators in the range of approximately 20 MHz.

SUMMARY OF THE INVENTION

The present invention overcomes this inherent frequency limitation by directly driving the switch which controls the current source from the tunnel diode. As explained previously, this can be accomplished only if the unpredictable second threshold of the tunnel diode is ignored by the circuit. For this reason, a latching circuit is incorporated which maintains the main current switch in an on or off condition between subsequent thresholding of a forward and reverse biased tunnel diode pair.

A voltage-to-current converter is utilized to monitor the voltage across an integrating device and to convert this voltage to a proportional current level. This current level is applied to a bipolar tunnel diode pair which is connected directly to control the current switch. In addition, a latching circuit is connected to the tunnel diodes so that when either of the tunnel diodes passes through its first threshold the latching circuit will activate to maintain the current switch in its new stage until the other tunnel diode causes a reversal in the current switch state and a reversal of state in the latching circuit. This circuit configuration enables the tunnel diodes to be directly connected to the current switch so that the triangle wave generator will satisfactorily operate at frequencies about 100 MHz.

These and other advantages of the present invention are best understood through a reference to the drawings, in which.

DETAILED DESCRIPTION OF THE PREFERRED EMBODIMENT

Figure 1:
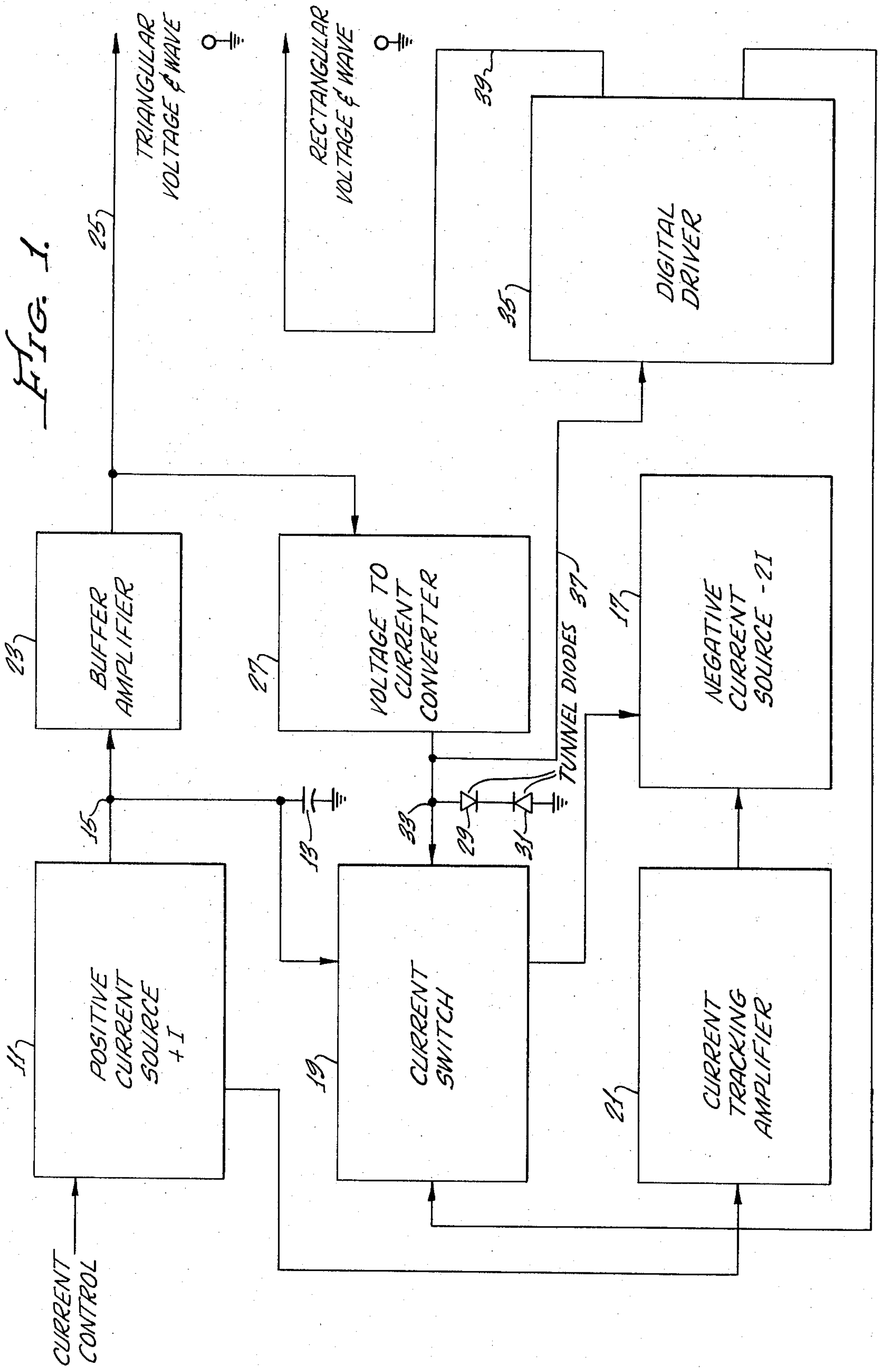
FIG. 1 is a block diagram of the triangle wave generator of the present invention.

Referring initially to FIG. 1, a positive current source 11 is coupled directly to a capacitor 13 which operates as the integrating device in the present circuit. As current flows from the positive current source 11 into the capacitor 13, the voltage across the capacitor 13 which appears at a point 15 will increase as a linear function with time. A negative current source 17 having a current which is twice the current of the source 11 is additionally connected to the integrating device 13 through a current switch 19. As is well known in the triangle wave generating art, the current switch 19 controls only the current from the negative current source 17. However, since the current source 17 is at twice the current level of the current source 11, it will be immediately recognized that when the current switch 19 is in an open circuit configuration the current source 11 will supply current to the integrating device 13 at a level +I. However, when the current switch 19 is in a closed circuit configuration the negative current source 17 will draw current through the switch 19 at a rate of −2I. One half of this current is supplied by the positive current source 11 but the other half of the current must be supplied by drawing current from the intergrating device 13. Thus, by simply controlling current flow in one direction through the current switch 19, it is well known that the integrating device 13 may be alternately charged and discharged so that the voltage at the point 15 alternately increases linearly with time or decreases linearly with time to form a triangular voltage waveform. In the preferred embodiment shown in FIG. 1 wherein the current source 17 has a current level which is twice that of the current source 11, the rate of increase of the voltage at the point 15 with time when the current switch 19 is open is precisely the same as the rate of decrease of voltage at the point 15 when the current switch 19 is closed.

In the present embodiment, a current tracking amplifier 21 is directly coupled to the current source 11 and controls the current source 17 to operate at precisely twice the level of the current source 11, so that a true triangle voltage wave will be produced at the point 15. An amplifier 23 is connected to the point 15 and produces the triangle voltage wave output from the triangle wave generator on a line 25. In addition, this triangular wave voltage is connected to a voltage-to-current converter 27 which is used to drive a pair of tunnel diodes 29 and 31. These tunnel diodes 29 and 31 are used to monitor the current produced by the voltage-to-current converter 27 which is proportional to the triangular voltage wave on the line 25 for directly driving the current switch 19. Thus, as current flows from the converter 27 through the tunnel diodes 29 and 31 to ground, the tunnel diode pair will exhibit a relatively low impedance until the threshold current level of the tunnel diode 29 is reached. At this point the impedance of the tunnel diode 29 will immediately increase and the voltage at a point 33 will immediately increase. This voltage at the point 33 is used to close the current switch 19, thereby connecting the negative current source 17 to the integrating device 13 so that the voltage at the point 15 will begin to decrease from its positive peak level. In addition, the increased voltage level at the point 33 will drive a digital driver 35 through a line 37. The digital driver 35 operates to change the bias levels on the current switch 19 so that, as the voltage at point 15 decreases and the current through the tunnel diode pair from the converter 27 similarly decreases, the thresholding of the tunnel diode 29 to its low impedance level will not change the state of the current switch 19.

When the voltage at the point 15 reaches the desired negative peak level, the current from the voltage-to-current converter 27 will be in the negative direction, that is, current will flow from ground through the tunnel diode pair 29 and 31 into the voltage-to-current converter 27. When this current reaches the threshold level of the tunnel diode 31, the tunnel diode 31 will immediately exhibit a high impedance so that the voltage at the point 33 will immediately shift to a negative level. This shift drives the current switch 19 to an open circuit condition and, in turn, through the line 27, drives the digital driver 35 to maintain a bias level on the current switch 19 which will hold the current switch 19 in this open circuit configuration until the tunnel diode 29 again passes through its threshold current level at the positive peak voltage of the waveform at the point 15. The digital driver operates as a bistable element and therefore a rectangular voltage waveform is conveniently available on an output line 39.

It can be seen, therefore, that the tunnel diode pair 29 and 31 directly controls the current switch 19 without the interposition of a bistable element which would introduce time delays between the thresholding of the tunnel diodes 29 and 31 and the activation of the current switch 19. Since the bistable element is not connected directly in the control between the tunnel diodes 29 and 31 and the current switch 19, a digital driver 35 is used as a latching circuit to maintain the current switch 19 in its on or off condition between successive thresholding of the tunnel diodes 29 and 31.

Figure 2:
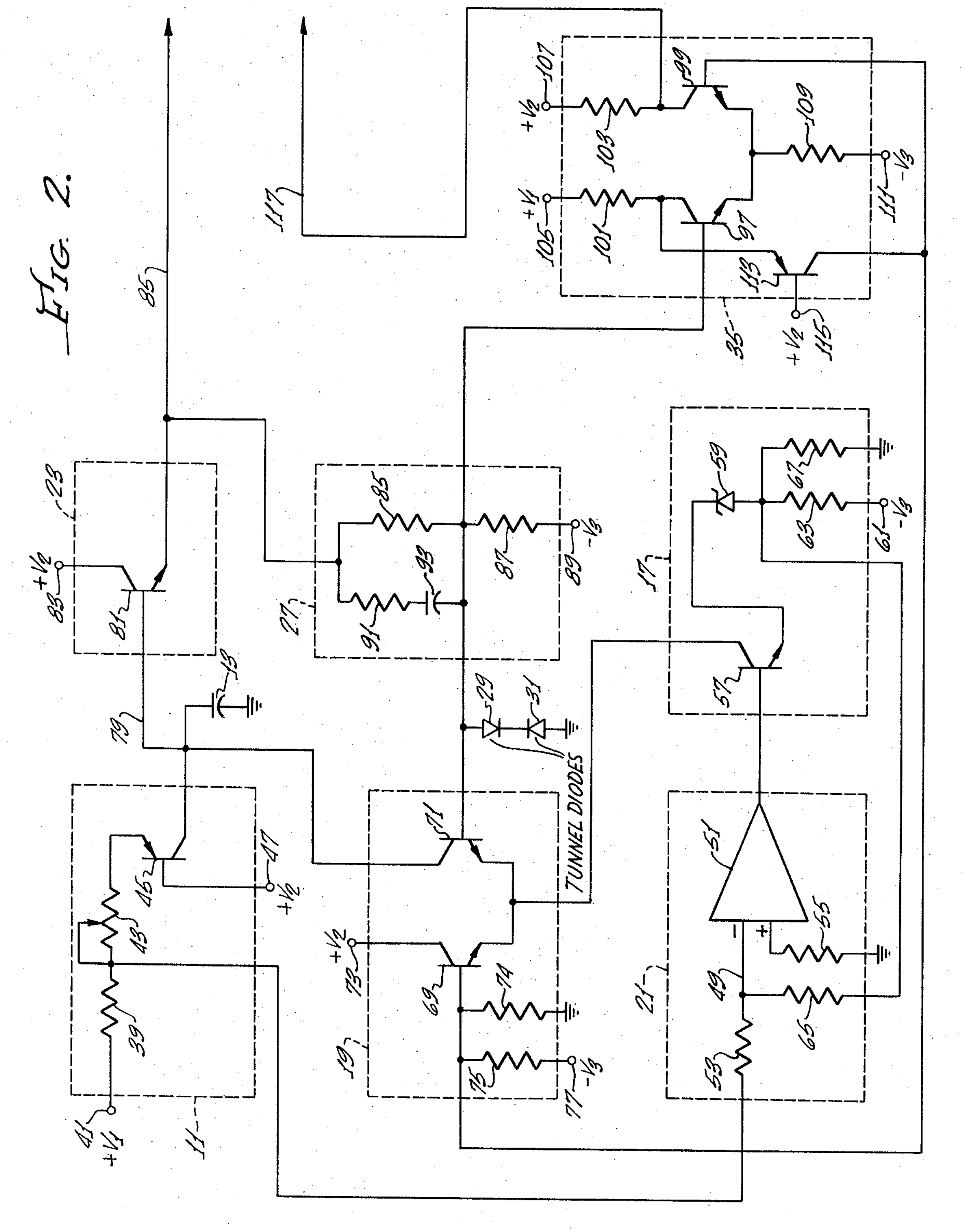
FIG. 2 is a schematic diagram showing the circuitry used in the preferred embodiment of the present invention.

Referring now to FIG. 2, the detailed circuitry of the preferred embodiment of the present invention will be described. The positive current source 11 for producing a current +I comprises an input resistor 39 which is connected to a positive voltage source +V1 at a point 41. The input resistor 39 is series connected to a potentiometer 43 which operates as a frequency adjustment. As will be readily recognized, the slope of the ramp signal produced in the integrating device 13 will depend upon the input current to the integrator 13. Thus, by varying the current, a predetermined threshold level at which the circuit will close the current switch 19 will be reached more rapidly, and the frequency of the triangle wave generator will be increased. The output of the resistor 43 is connected to a common base transistor 45 having a relatively low input impedance and a high output impedance so that it operates as an impedance converter to drive the integrating device or capacitor 13 with a predetermined current +I. The base of the transistor 45 is connected to a reference voltage 30 V2 at point 47.

The negative current source for producing a current of −2I could be constructed in a similar manner to the positive voltage source 11 by simply connecting a common base transistor to a negative voltage supply having a voltage equal to −V1 through a resistor having half the resistance of the resistors 39 and 43, so that a current level of −2I could be approximated. In the preferred embodiment, however, a current tracking amplifier 21 is used to assure that the −2I current is precisely controlled in response to the +I current produced by the positive current source 11 at all times. This is accomplished by connecting the inverting input 49 of an operational amplifier 51 to the junction of the resistors 39 and 43 through an input resistor 53. The noninverting input of the operational amplifier 51 is connected to ground through a resistor 55. The output of the operational amplifier 51 is connected to the base of the common base connected transistor 57 of the −2I current supply. The emitter of this transistor 57 is connected through a zener diode 59 which is used as a voltage level shifting device. The anode of the zener diode 59 is in turn connected to a negative voltage source −V3 at a point 61 through a resistor 63. The resistor 63 is selected to have precisely half the resistance of the resistor 39 so that if the voltage drop across the resistor 63 is maintained at an identical level with the voltage drop across the resistor 39, the current through the zener diode 59 and the emitter-collector junction of the transistor 57 will be precisely twice the current which flows through the transistor 45 of the positive current source 11. This is accomplished through a feedback loop through a resistor 65 which is connected to the junction of the anode of the zener diode 59 and an output resistor 67 which is connected to ground. The resistors 53, 65 and 67 are selected to have the same resistance. Thus, the combination of the amplifier 51 and the feedback loop creates a unity closed loop gain feedback amplifier. For a predetermined voltage drop across the resistor 39, a corresponding voltage drop will be imposed across the resistor 63 by the operational amplifier 51 so that, since the resistor 63 has precisely half the resistance of the resistor 39, the current through the emitter-collector junction of the transistor 57 will be twice that of the current through the similar junction of the transistor 45. If the voltage level at the junction of the resistors 39 and 43 shifts to a more negative value, for example, the input to the operational amplifier 51 will shift to a more negative value causing the output of the operational amplifier to shift to a more positive value so that the anode of the zener diode 59 will shift to a more positive voltage level to a sufficient degree to cancel out, through the feedback resistor 65, the more negative input through the input resistor 53.

The collector of the transistor 57, which is the output of the −2I current source 17, is connected through the current switch 19 to the capacitor 13. The current switch 19 includes a pair of transistors 69 and 71. The transistor 71 operates as the current switch between the −2I current source 17 and the capacitor 13. The transistor pair 69 and 71 operate such that if the base of the transistor 71 is more positive than the base of the transistor 69, the current switch will be on, that is, the collector emitter junction of the transistor 71 will be a low impedance connection between the −2I current source 17 and the capacitor 13. Whenever the base of the transistor 69 is more positive than the base of the transistor 71, the transistor 71 will be nonconductive and the current switch 19 will be off. The transistors 69 and 71 thus operate as a current mode pair. As is well known, when the transistor 71 is conductive, both the base and the emitter of the transistor 71 will become more positive so that the emitter of the transistor 69 becomes more positive than the base of the transistor 69, causing the transistor 69 to become nonconductive. When, however, the base of the transistor 69 becomes more positive than this level, the transistor 69 will conduct current from a positive voltage source +V2 at a point 73. Current will now flow between the positive voltage source at point 73 and the negative voltage source at point 61, raising the potential at the emitter of the transistor 71 to reverse bias the transistor 71 to shut off the current switch 19. A resistor 74 is connected between the base of the transistor 69 and ground and a resistor 75 connected between a point 77 which is connected to a negative voltage source −V3 and the base of the transistor 69 operate to bias the base of the transistor 69. In the preferred embodiment, the resistors 74 and 75 are selected to bias the base of the transistor 69 at −250 millivolts. This bias level aids in the proper control of the current switch 19 from the digital driver 35 as will be explained below.

The voltage at the integrator or capacitor 13 is monitored through a line 79 by a common collector transistor amplifier 81 which serves as the buffer amplifier 23. The transistor 81 has a collector connected to a positive voltage source +V2 at a point 83 and has a high input impedance and relatively low output impedance to isolate the capacitor 13 from the voltage-to-current converter 27 and from the output of the triangle wave generator on line 85.

The voltage-to-current converter 27 comprises a pair of resistors 85 and 87 connected between the output of the buffer amplifier 23 and a negative voltage source −V3 at a point 89; and a resistor 91 and capacitor 93 connected in series with another and in parallel with the resistor 85.

The combination of the resistor 91 and capacitor 93 in the voltage-to-current converter operates as a lead network to alleviate any time delay which may occur between the voltage level at the integrating device 13 and the tunnel diode pair 29 and 31, caused, for example, by the buffer amplifier 23. This assures, therefore, that the tunnel diode pair will properly track the voltage level on the capacitor 13 so that threshold will be reached at precisely the proper voltage level.

Figure 3A:
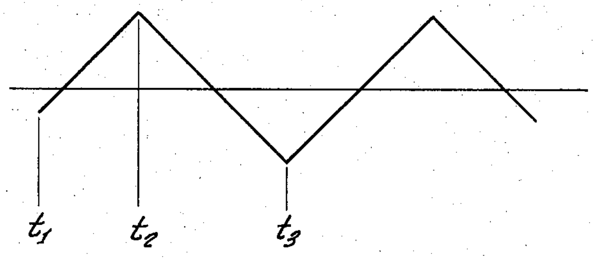
FIGS. 3*a*–3*d* are diagrams showing the waveforms present on various components of the circuit of FIG. 2.
Figure 3B:
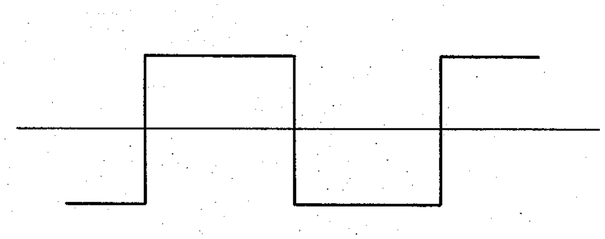
Figure 3C:
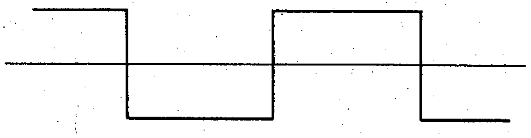
Figure 3D:
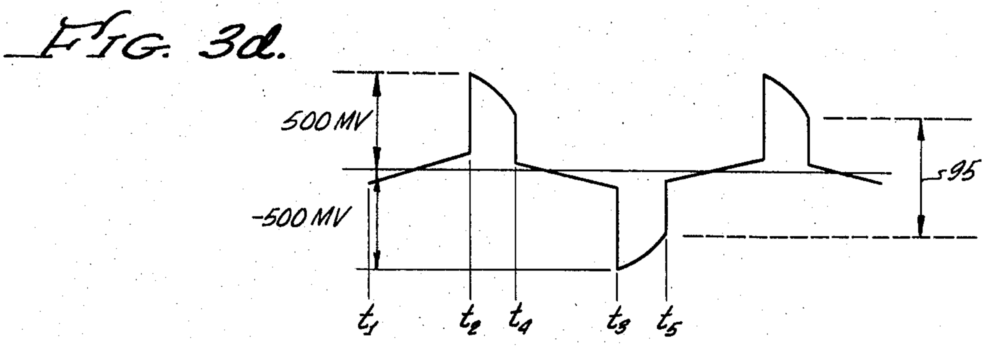

The voltage-to-current converter 27 produces a current through the pair of tunnel diodes 29 and 31 which are connected between the junction of the capacitor 93 and the resistors 85 and 87 and ground. The voltage across the pair of tunnel diodes 29 and 31 is shown in FIG. 3*d* and may be compared with the voltage at the capacitor 13 shown in FIG. 3*a*. As will be noted, the current through the tunnel diodes 29 and 31 is in a direction from the voltage-to-current converter 27 to ground when the triangle waveform at the capacitor 13 is positive. Likewise, when the voltage at the capacitor 13 is negative, current will flow through the pair of tunnel diodes 29 and 31 from ground into the voltage-to-current converter 27. As has been explained previously, when a tunnel diode is forward biased it will exhibit a relatively low impedance until a predetermined threshold current is reached, at which time the tunnel diode will immediately exhibit a relatively high impedance. Referring specifically to FIG. 3*d*, it will be noted that, in the preferred embodiment, the tunnel diode exhibits a first relatively low impedance between the time T1 and the time T2 as the triangle wave approaches the positive peak voltage level. At time T2, current through the forward biased tunnel diode 29 reaches the threshold level and the impedance of the tunnel diode 29 immediately increases so that, instead of exhibiting a voltage drop of approximately 100 millivolts, the tunnel diode 29 immediately exhibits a voltage drop of approximately 500 millivolts. As will be explained in more detail below, this transition of the tunnel diode 29 closes the current switch 19 so that a negative current −I is drawn from the capacitor 13 and the capacitor 13, as shown in FIG. 3a, has a linearly decreasing voltage until time T3. Referring again to FIG. 3d, it will be noted that the tunnel diode 29 exhibits its relatively high voltage drop until the current therethrough reaches some positive value lower than the peak positive current value, at which time the tunnel diode 29 goes through a second transition to a relatively low voltage drop as shown at the time T4. The particular current level at which this second threshold occurs is relatively uncertain and, for this reason, a bracket 95 in FIG. 3*d* encloses a zone of relative uncertainty.

In a manner identical to that described above, when the capacitor 13 reaches a peak negative voltage at time T3, the current flowing in a forward biased direction through the tunnel diode 31 reaches the threshold level of this tunnel diode, so that the voltage drop across the tunnel diode 31 immediately increases to approximately 500 millivolts. This threshold causes, as will be explained below, the current switch 19 to turn off so that the positive current source 11 will increase the voltage of the capacitor 13. This process continues as is shown in FIGS. 3*a* and 3*d*.

Referring once again to FIG. 2, it will be noted that the digital driver 35 is likewise connected to the junction between the capacitor 93, the resistor 85 and the resistor 87 and is thus tied directly to the anode of the tunnel diode 29. The digital driver 35 operates as a latching device to maintain the current switch 19 in an on or off state after it has been triggered to one of these states by the pair of tunnel diodes 29 and 31. A pair of transistors 97 and 99 operate as a current mode pair in a manner similar to the transistors 69 and 71. The base of the transistor 97 is subjected to the voltage drop across the tunnel diode pair 29 and 31 shown in FIG. 3*d*. The base of the transistor 99 is connected to the base of the transistor 69 so that it is biased to a −250 millivolts unless a different signal is impressed on it, as will be explained below. The collectors of the transistors 97 and 99 are connected through resistors 101 and 103 to positive voltage supplies +V1 and +V2 at point 105 and point 107, respectively. The emitters of the transistors 97 and 99 are connected through a common resistor 109 to a negative voltage supply −V3 at a point 111. In addition, the emitter of an additional transistor 113 is connected to the junction of the collector of the transistor 97 and the resistor 101. The base of the resistor 113 is connected to a positive voltage source +V2 at a point 115 and the collector of the transistor 113 is connected to the base of the transistor 99 and the base of the transistor 69. A rectangular waveform, as shown in FIG. 3*b*, exists at the collector of the transistor 99 as an output rectangular waveform on a line 117. The base of the transistor 99 and the base of the transistor 69 exhibit a voltage curve which is shown in FIG. 3c.

The operation of the digital driver 35 in latching the current switch 19 may now be described in reference to both FIG. 2 and FIG. 3. Beginning with time T1, assume that the current switch 19 is off, that is, the transistor 71 is nonconductive. Thus, only the positive current source 11 is connected to the integrating device 13 and the charge level on the integrating device 13 is increasing so that the voltage as shown in FIG. 3a is increasing as a linear function. During this voltage buildup period the base of the transistor 69 and the base of the transistor 99 are each maintained at a level of +250 millivolts by current flowing from the voltage source at point 105 through the resistor 101 and the transistor 113. As will be recognized, when the transistor 97 is off, the transistor 113 is biased for conduction and current flowing through the transistor 113 from the voltage source at 105 will maintain the base of the transistors 69 and 99 at +250 millivolts as shown in FIG. 3*c*. Thus, each of the transistors 69 and 99 is biased for conduction while the transistors 71 and 97 are biased for nonconduction. This occurs because the bases of the transistors 69 and 99 are more positive than the bases of the transistors 71 and 97. The bases of the latter transistors are connected to the pair of tunnel diodes 29 and 31 and have a voltage level as shown in FIG. 3*d*, that is, a voltage level which is more negative than the voltage level shown in FIG. 3*c*. The rectangular output waveform on line 117, as shown in FIG. 3*b*, remains at a negative voltage level since the collector-to-emitter junction of the transistor 99 is conductive and permits the voltage on the line 117 to be influenced by the voltage supply at 111.

When the tunnel diode 29 reaches its threshold current level, the voltage drop across the pair of tunnel diodes 29 and 31 immediately thresholds to an increase level as shown in FIG. 3d so that the voltage drop across the pair of tunnel diodes 29 and 31 is approximately 500 millivolts. Thus, the voltage at the base of the transistors 71 and 97 immediately follows this voltage increase so that, since the base of the transistors 69 and 99 is still maintained at a level of +250 millivolts, the bases of the transistors 71 and 97 are now more positive. The transistors 71 and 97 therefore immediately become conductive and the transistors 69 and 99 immediately become nonconductive. Current will now flow between the voltage source at point 105 through the transistor 97 to the voltage source at point 11, drawing current from the transistor 113 so that the transistor 113 becomes reverse biased and is shut off. The voltage level on the base of the transistors 99 and 69 is now controlled by the bias resistors 73 and 75 and therefore maintained at a level of −250 millivolts. The output rectangular waveform on the line 117 now goes to a positive level since the transistor 99 is nonconductive and the voltage at the source 107 is impressed upon the line 117.

It will be recognized by those skilled in the art that a certain time lapse occurs in the switching of the transistors 97 and 99 and the resulting change in the bias level on the base of the transistors 69 and 99, due to the inherent time delays in the system components. However, the tunnel diode pair 29 and 31, being directly connected to the base of the transistor 71, will cause the transistor 71 to immediately become conductive without the interposition of a time delay. Therefore, the current switch 19 immediately becomes conductive and it is only necessary that the bases of the transistors 69 and 99 reach their new potential of −250 millivolts before the bases of the transistors 69 and 99 are reduced in potential to +250 millivolts. In other words, it is only necessary to assure that the bases of the transistors 69 and 99 remain more negative than the bases of the transistors 71 and 97. As shown in FIG. 3*d*, the reduction in the voltage level at the bases of the transistors 71 and 97 occurs relatively slowly as the voltage-to-current converter tracks the output triangle waveform of FIG. 3*a*. The digital driver circuit 35 therefore operates as a latching device preparing the bases of the transistors 69 and 99 for the threshold of the tunnel diode 31 at the negative peak value of the triangle waveform.

When the triangle waveform on the line 85 shown in FIG. 3*a* reaches a negative peak value, the current from ground through the tunnel diode pair 29 and 31 into the voltage-to-current converter 27 reaches the threshold level of the tunnel diode 31. Thus, at time T3 shown in FIG. 3d the voltage across the pair of tunnel diodes 29 and 31 thresholds to approximately 500 millivolts so that the bases of the transistors 71 and 97 immediately reach a value of approximately −500 millivolts. Since, as explained previously, the bases of the transistors 69 and 99 are still maintained at approximately −250 millivolts by the bias resistors 73 and 75, the transistors 69 and 99 become conductive, their bases being more positive than the bases of the transistors 71 and 97. The current switch 19 therefore becomes nonconductive since the transistor 71 is biased for nonconduction and current is supplied to the integrating device 13 solely by the positive current source 11. The transistor 97 is nonconductive so that current will now flow to forward bias the transistor 113 to clamp the bases of the transistors 69 and 99 at a level of +250 millivolts. This +250 millivolts level is sufficient to assure that the bases of the transistors 69 and 99 remain more positive than the bases of the transistors 71 and 97 until the thresholding of the tunnel diode 29, as was explained previously. Again, a certain time delay is inherent in the digital driver circuit 35 in driving the bases of the transistors 69 and 99 to the +250 millivolt level. However, this time is permissible since the tunnel diode 31 remains at its relatively high voltage drop level until the second threshold level of this tunnel diode is reached at time T5 of FIG. 3*d*, so that the time delay in the digital driver circuit 35 is masked by the direct coupling of the tunnel diode pair 29 and 31 to the current switch 19.

What is claimed is:

1. A triangle wave generator capable of high frequency operation, comprising:
- a current source;
- an integrating device coupled to the output of said current source;
- a switch, interposed in series between said current source and said integrating device; and
- a tunnel diode, responsive to the voltage output of said integrating device, said tunnel diode being directly connected to said switch to directly drive said switch to close the circuit between said current source and said integrating device, without the interposition of a bistable device between said tunnel diode and said switch which would delay the operation of said switch in response to said tunnel diode.

2. A triangle wave generator as defined in claim 1 additionally comprising:
- a second tunnel diode, responsive to said voltage output of said integrating device, said tunnel diode being directly connected to said switch to directly drive said switch to open the circuit between said current source and said integrating device, without the interposition of a bistable device between said second tunnel diode and said switch which would delay the operation of said switch in response to said second tunnel diode.

3. A triangle wave generator as defined in claim 2 additionally comprising:
- a latching circuit, responsive to said pair of tunnel diodes for maintaining said switch in a closed or open configuration between successive driving of said switch by said tunnel diode and said second tunnel diode.

4. A triangle wave generator as defined in claim 1 additionally comprising:
- a second current source connected to said integrating device, said integrating device connected to integrate the sum of said current source and said second current source.

5. A triangle wave generator, comprising:
- means for generating a positive-going ramp signal;
- means for generating a negative-going ramp signal;
- switching means connected in series with one of said positive-going and negative-going ramp signal generating means for selectively producing said positivegoing ramp signal or said negative going ramp signal as an output signal;
- a tunnel diode, responsive to said output signal for producing a triggering signal; and
- means for directly connecting said tunnel diode to said switching means to directly drive said means for selectively producing with said triggering signal without the interposition of a bistable device between said tunnel diode and said switching means which would delay operation of said switching means in response to said triggering signal.

6. A triangle wave generator, as defined in claim 5, additionally comprising:
- latching means for preventing a change in the operation of said selectively producing means in the absence of said triggering signal.

7. A triangle wave generator as defined in claim 6, additionally comprising:
- a second tunnel diode responsive to said output signal for producing a second triggering signal; and
- means for connecting said second triggering signal to directly drive said switching means.

8. A waveform generator, comprising:
- a first current source for producing a first current I;
- a second current source for producing a second current −2I;
- a current switch connected to control current from said second current source;
- an integrating device connected to said first current source and series connected by said current switch to said second current source to alternately integrate the current from said first current source or the sum of the currents from said first and second current sources in accordance with the state of said current switch, said
- integrating device producing an output voltage signal;
- means for generating a control current signal proportional to said output voltage signal;
- a pair of tunnel diodes connected in reverse polarities to conduct said control current signal, said tunnel diodes producing a triggering signal at positive and negative predetermined threshold levels of said control current;
- means directly coupling said triggering signal to said current switch to control the state of said current switch without the interposition of a bistable device between said tunnel diode pair and said switch which would delay the operation of said switch in response to said tunnel diode pair; and
- a latching circuit coupled to said triggering signal and said current switch for maintaining said current switch in a predetermined state between successive triggering signals.

9. A waveform generator as defined in claim 8 wherein said current switch comprises a current mode transistor pair, one of said transistors connected to selectively conduct current from said second current source to said integrating device.

10. A waveform generator as defined in claim 9 wherein the other of said transistors is controlled by said latching circuit and said one of said transistors is directly coupled to said pair of tunnel diodes.

11. A waveform generator as defined in claim 8 wherein said control current signal generating means comprises a lead network for eliminating time delays between said output voltage signal and said tunnel diode pair.

12. A waveform generator as defined in claim 8 additionally comprising:

means for controlling said second current source in response to said first current I to maintain a predetermined relationship between said first and second currents.

13. Apparatus for producing an output signal having alternate positive-going and negative-going ramp signal portions, comprising:

integrating means;

a current source;

a switch series connected between said integrating means and said current source to control the current flow between said current source and said integrating means; and a tunnel diode responsively connected to said output signal and connected directly to said switch to directly drive said switch periodically without the interposition of a bistable device between said tunnel diode and said switch which would delay operation of said switch in response to said tunnel diode.

14. Apparatus for producing an output signal as defined in claim 13 additionally comprising:

a second current source connected to continuously supply current to said integrating device.

15. Apparatus for producing an output signal as defined in claim 13 additionally comprising:

means responsive to said tunnel diode and connected to said switch for maintaining the state of said switch constant between periodic driving of said switch by said tunnel diode.

* * * * *